(12) United States Patent
Murschall et al.

(10) Patent No.: US 6,939,600 B2
(45) Date of Patent: *Sep. 6, 2005

(54) OPAQUE, WHITE FILM WITH LOW TRANSPARENCY MADE FROM A CRYSTALLIZABLE THERMOPLASTIC

(75) Inventors: Ursula Murschall, Nierstein (DE); Ulrich Kern, Ingelheim (DE); Klaus Oberlaender, Wiesbaden (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/429,841

(22) Filed: May 5, 2003

(65) Prior Publication Data

US 2003/0224193 A1 Dec. 4, 2003

Related U.S. Application Data

(63) Continuation of application No. 09/767,049, filed on Jan. 22, 2001, now abandoned.

(30) Foreign Application Priority Data

Feb. 19, 2000 (DE) .......................................... 100 07 671

(51) Int. Cl.[7] .......................... B32B 7/02; B32B 19/00; B32B 27/36; C08K 3/30
(52) U.S. Cl. ...................... 428/212; 428/220; 428/357; 428/480; 428/34.7; 428/35.7; 428/500; 523/351; 524/423
(58) Field of Search ................................. 428/220, 357, 428/480, 212, 34.7, 35.7, 500; 523/351; 524/423

(56) References Cited

U.S. PATENT DOCUMENTS

| | | | | |
|---|---|---|---|---|
| 4,384,040 A | * | 5/1983 | von Meer | 430/532 |
| 4,780,402 A | | 10/1988 | Remmington | 430/533 |
| 5,660,931 A | * | 8/1997 | Kim et al. | 428/357 |
| 6,282,491 B1 | | 8/2001 | Bochmann et al. | |
| 6,426,709 B1 | | 7/2002 | Becker et al. | |
| 6,521,351 B2 | * | 2/2003 | Murschall et al. | 428/480 |
| 6,641,924 B1 | * | 11/2003 | Peiffer et al. | 428/480 |

FOREIGN PATENT DOCUMENTS

EP 0 857 749 A1 8/1998 .............. C08J/5/18

OTHER PUBLICATIONS

"USA: Nissan standardises telematics on 2003 Infiniti models"; Apr. 3, 2002; www.just–auto.com.
"The Meaning of Telematics"; Oct. 22, 2002; www.global-telematics.com/telematics.htm.
Kuriko Miyake; "DoCoMo, Nissan to develop car telematics"; Feb. 19, 2002; IDG New Service\Tokyo Bureau.
"GDT And TrafficCast To Deliver Real–Time Traffic Information"; Mar. 20, 2003; www.itsa.org.
"Communications Industry Considers Measures To Ensure It Meets The Needs Of Public Safety During Crisis"; Mar. 17, 2003; www.itsa.org.
"Product Innovations Drive the Emerging Automotive Entertainment and Navigation Systems Marker"; Mar. 19, 2003; www.itsa.org.
ISO, Paints and Varnishes, International Standard, 1994 12 pages, International Organization for Standardization, Switzerland.
Maria E. Nadal and Ambler Thompson, *NIST Reference Goniophotometer for Specular Gloss Measurements*, Jun. 2001, 14 pages, vol. 73, No. 917, Jun. 2001, Gaithersburg, MD.
*Reflektometer Als Hilfsmittal Zur Glanzbeurteilung An Ebenen Anstrich–Und Kunstsoff–Oberflachen*, 5 pages, Jan. 1982, Din Deutsches Institute fur Normung EV.
MEBPRAXIS.
Byk–Gardner GmbH and Byk–Gardner, USA, Einfurung, 3 pages, Germany, Byk–Gardner–USA.

* cited by examiner

*Primary Examiner*—Rena Dye
*Assistant Examiner*—Lawrence Ferguson
(74) *Attorney, Agent, or Firm*—ProPat, L.L.C.

(57) ABSTRACT

The present invention relates to an opaque, white film with a thickness of from 10 to 500 μm whose principal constituent is a crystallizable thermoplastic. It also comprises at least barium sulfate and at least one optical brightener. The barium sulfate and/or the optical brightener here is either incorporated directly into the thermoplastic during preparation of the polymer or fed as a masterbatch during film production. The novel film is particularly suitable for interior decoration, for constructing exhibition stands, for exhibition requisites, for displays, for placards, for labels, for protective glazing of machines or of vehicles, in the lighting sector, in the fitting out of shops or of stores, as a promotional requisite or a laminating material, or in applications associated with food or drink.

19 Claims, No Drawings

OPAQUE, WHITE FILM WITH LOW TRANSPARENCY MADE FROM A CRYSTALLIZABLE THERMOPLASTIC

This application is a continuation of application Ser. No. 09/767,049 filed Jan. 22, 2001, which is now abandoned.

The invention relates to an opaque, white film with low transparency made from a crystallizable thermoplastic and having a thickness of from 10 to 500 µm. The film comprises at least barium sulfate and also an optical brightener, and has good orientability, low transparency, and also very good optical and mechanical properties. The invention further relates to a process for producing this film and to the use of the film.

BACKGROUND OF THE INVENTION

Opaque films with a thickness of from 10 to 500 µm are well known.

The object of the present invention was to provide an opaque, white film with a thickness of from 10 to 500 µm which, besides having good orientability, good mechanical properties and good optical properties and a low Yellowness Index, above all has high whiteness and low transparency.

The good optical properties include uniform, streak-free coloration over the entire length and width of the film, low luminous transmittance/transparency ($\leq 30\%$), acceptable surface gloss ($\geq 10$), and also a low Yellowness Index (dependent on thickness, $\leq 45$ for 250 µm films and $\leq 20$ for 50 µm films).

The good mechanical properties include a high modulus of elasticity ($E_{MD} \geq 3300$ N/mm$^2$; $E_{TD} \geq 4200$ N/mm$^2$), and also good tear strengths (in MD$\geq 120$ N/mm$^2$; in TD$\geq 170$ N/mm$^2$) and good longitudinal and transverse elongations at break (in MD$\geq 120\%$; in TD$\geq 50\%$).

Good orientability includes excellent capabilities of the film for orientation during its production, both longitudinally and transversely, without break-offs. The novel film should moreover be recyclable, that is to say that any cut material arising during continuous film production can be fed back into the production operation as regrind, in particular without loss of optical or mechanical properties from the film, so that it can still be used for interior applications and in constructing exhibition stands, for example.

DESCRIPTION OF THE INVENTION

This object is achieved by an opaque white film with a thickness of from 10 to 500 µm whose principal constituent is a crystallizable thermoplastic, wherein the film comprises at least barium sulfate and at least one optical brightener, and the barium sulfate and/or the optical brightener either may be incorporated directly into the thermoplastic during preparation of the polymer or is fed as a masterbatch during film production.

The novel film comprises, as principal constituent, a crystallizable thermoplastic. Examples of suitable crystallizable or semicrystalline thermoplastics are polyethylene terephthalate, polybutylene terephthalate and polyethylene naphthalate, and preference is given to polyethylene terephthalate.

For the purposes of the present invention, a crystallizable thermoplastic is
a crystallizable homopolymer;
a crystallizable copolymer;
a crystallizable compound;
a crystallizable recycled material, or
another type of crystallizable thermoplastic.

The novel film may have one layer, or else two or more layers, and it may have been coated with various copolyesters or with adhesion promoters.

The film comprises at least barium sulfate as pigment, and the amount of pigment here is preferably from 0.2 to 40% by weight, based on the weight of the crystallizable thermoplastic. The barium sulfate is preferably fed to the thermoplastic by way of what is known as masterbatch technology during film production.

The film comprises at least one optical brightener, and the amount of the optical brightener used here is from 10 to 50,000 ppm, in particular from 20 to 30,000 ppm, particularly preferably from 50 to 25,000 ppm, based on the weight of the crystallizable thermoplastic. It is preferable for the optical brightener, too, to be fed to the thermoplastic by way of what is known as masterbatch technology during film production.

The optical brighteners according to the invention are capable of absorbing UV radiation in the region from 360 to 380 nm and of re-emitting this as longer-wavelength, visible blue-violet light.

Suitable optical brighteners are bisbenzoxazoles, phenylcoumarins and bisstearylbiphenyls, in particular phenylcoumarin, and particularly preferably triazine phenylcoumarin, obtainable as the product ºTinopal from Ciba-Geigy, Basle, Switzerland, or else ºHostalux KS (Clariant, Germany), or else ºEastobrite OB-1 (Eastman).

Besides the optical brightener, blue dyes soluble in polyester may also be added if this is useful. Dyes which have proven successful are cobalt blue, ultramarine blue and anthraquinone dyes, in particular Sudan Blue 2 (BASF, Ludwigshafen, Germany).

The amounts of the blue dyes used are from 10 to 10,000 ppm, in particular from 20 to 5000 ppm, particularly preferably from 50 to 1000 ppm, based on the weight of the crystallizable thermoplastic.

It was highly surprising that the use of the abovementioned combination of barium sulfate, optical brightener and, if present, blue dyes in the films in conjunction with the increased longitudinal stretching ratio during film production gave the desired result.

It is also very surprising that the cut film material can also be reused as regrind for production of the film without any adverse effect on the Yellowness Index of the film.

A preferred embodiment uses precipitated grades of barium sulfate. Precipitated barium sulfate is obtained as a fine-particle colorless powder from barium salts and sulfates or sulfuric acid, and the particle size of the powder can be controlled via the conditions of precipitation. Precipitated barium sulfates may be prepared by the usual processes, which are described in Kunststoff-Journal 8, No. 10, 30–36 and No. 11, 36–31 (1974).

The amount of barium sulfate is appropriately from 0.2 to 40% by weight, preferably from 0.5 to 30% by weight, particularly preferably from 1 to 25% by weight, based on the weight of the thermoplastic.

The average particle size of the barium sulfate is relatively small and is preferably from 0.1 to 5 µm, particularly preferably from 0.2 to 3 µm (Sedigraph method). The density of the barium sulfate used is from 4 to 5 g/cm$^3$.

In one particularly preferred embodiment, the novel film comprises, as principal constituent, a crystallizable polyethylene terephthalate, and also from 1 to 25% by weight of precipitated barium sulfate, appropriately with a particle diameter of from 0.4 to 1 µm, particularly preferably ºBlanc fixe XR-HX or Blanc fixe HXH from Sachtleben Chemie.

The novel film also preferably comprises from 10 to 50,000 ppm of an optical brightener soluble in the crystallizable thermoplastic, particularly preferably triazine phenylcoumarin (Tinopal, Ciba-Geigy, Basle, Switzerland), Hostalux KS, or else Eastobrite OB-1 (Eastman).

The surface gloss of the novel opaque white film, measured to DIN 67530 (measurement angle 20°) is greater than or equal to 10, preferably greater than or equal to 15.

The luminous transmittance (transparency) of the novel opaque white film, measured to ASTM-D 1003, is less than or equal to 30%, preferably less than or equal to 25%. The coloration is uniform and streak-free over the entire running length and width of the film.

As a result of the synergistic action of the additives barium sulfate, optical brightener and, if present, blue dye, in conjunction with optimized longitudinal stretching conditions, the film is whiter, that is to say has less yellow tinge, and has lower light transmittance, that is to say lower transparency, than a film provided only with barium sulfate.

The longitudinal modulus of elasticity (ISO 527-1-2) of the novel opaque white film is greater than or equal to 3300 N/mm$^2$, preferably greater than or equal to 3500 N/mm$^2$. Its transverse modulus of elasticity (ISO 527-1-2) is greater than or equal to 4200 N/mm$^2$, preferably greater than or equal to 4400 N/mm$^2$.

The standard viscosity SV (DCA) of the polyethylene terephthalate, measured in dichloroacetic acid to DIN 53728, is from 600 to 1100, preferably from 700 to 1000.

The intrinsic viscosity IV (DCA) is calculated from the standard viscosity SV (DCA) as follows:

$$IV(DCA) = 6.67 \cdot 10^{-4} SV(DCA) + 0.118$$

The opaque white polyethylene terephthalate film which comprises at least barium sulfate, one optical brightener and, if desired, blue dyes may have either one layer or else two or more layers.

In the embodiment having two or more layers, the film has a structure of at least one core layer and at least one outer layer, and particular preference is given here to a three-layer A-B-A or A-B-C structure.

A substantive factor for the embodiment having two or more layers is that the polyethylene terephthalate of the core layer has a standard viscosity similar to that of the polyethylene terephthalate of the outer layer(s) which is/are adjacent to the core layer.

In one particular embodiment, the outer layers may also be composed of a polyethylene naphthalate homopolymer or of a polyethylene terephthalate-polyethylene naphthalate copolymer, or of a compound. In this particular embodiment, the thermoplastics of the outer layers likewise have a standard viscosity similar to that of the polyethylene terephthalate of the core layer.

In the embodiment having two or more layers, the barium sulfate and also the optical brightener and, if present, the blue dye are preferably present in the core layer. However, modification of the outer layers is also possible, if required.

In the embodiment having two or more layers, unlike in the single-layer embodiment, the amounts given for the additives are based on the weight of the thermoplastics in the layer provided with the additive(s).

There may also be provision of a scratch-resistant coating, a copolyester or an adhesion promoter on one or more sides of the film.

In addition, the novel film is easy to recycle without pollution of the environment and without loss of mechanical properties, making it suitable, for example, for use as short-lived promotional placards, labels or other promotional requisites.

An example of a production process for producing the novel film is extrusion on an extrusion line.

According to the invention, the barium sulfate, the optical brightener and, if present, the blue dye may be incorporated directly when the thermoplastic polymer is prepared, or fed into the extruder by way of masterbatch technology during film production. It is preferable for the barium sulfate, the optical brightener and, if present, the blue dye to be fed by way of masterbatch technology. The additives are fully dispersed in a solid carrier material. Carrier materials which may be used are the thermoplastic itself, e.g. the polyethylene terephthalate, or else other polymers sufficiently compatible with the thermoplastic.

It is important that the particle size and the bulk density of the masterbatch(es) are similar to the particle size and the bulk density of the thermoplastic, so that uniform dispersion is achieved, and, with this, uniform whiteness and thus uniform opacity.

The polyester films may be produced by known processes from a polyester with, if desired, other polymers, and also with the optical brightener, the barium sulfate, if desired with the blue dye, and/or with a usual amount of from 0.1 to a maximum of 10% by weight of other customary additives, either in the form of monofilms or else in the form of, if desired, coextruded films having two or more layers and with identical or differently constructed surfaces, where one surface may have provision of pigment, but no pigment is present in the other surface. Known processes may also have been used to provide one or both surfaces of the film with a conventional functional coating.

In the preferred extrusion process for producing the polyester film, the molten polyester material is extruded through a slot die and quenched on a chill roll, as a substantially amorphous prefilm. This film is then reheated and stretched longitudinally and transversely, or transversely and longitudinally, or longitudinally, transversely and again longitudinally and/or transversely. According to the invention, the stretching temperatures are from $T_g+10$ K to $T_g+60$ K (where $T_g$ is the glass transition temperature), the longitudinal stretching ratio according to the invention is from 2 to 5, in particular from 2.5 to 4.5, and the transverse stretching ratio is from 2 to 5, in particular from 3 to 4.5, and the ratio for any second longitudinal stretching carried out is from 1.1 to 3. The first longitudinal stretching may, if desired, be carried out simultaneously with the transverse stretching (simultaneous stretching). This is followed by the heat-setting of the film at oven temperatures of from 200 to 260° C., in particular from 220 to 250° C. The film is then cooled and wound up.

An entirely unexpected finding was that the process parameters for the longitudinal stretching are a variable which significantly affects the optical properties (transparency) of the film. The process parameters for the longitudinal stretching include in particular the longitudinal stretching ratio and the longitudinal stretching temperature. It was highly surprising that the transparency could be markedly affected by varying the longitudinal stretching ratio. If, for example, a film plant produces a film whose transparency is above the values according to the invention, novel films with a lower transparency can be produced by increasing the longitudinal stretching ratio during the longitudinal stretching procedure. A relative increase of 7% in the longitudinal stretching ratio gave a relative reduction of from 15 to 20% in transparency.

The surprising combination of excellent properties makes the novel film highly suitable for a variety of different applications, such as interior decoration, for constructing exhibition stands, for exhibition requisites, for displays, for placards, for labels, for protective glazing of machines or of vehicles, in the lighting sector, in the fitting out of shops or of stores, as a promotional requisite or a laminating material, or in applications associated with food or drink.

The examples below illustrate the invention in more detail.

The following standards and methods are used here when testing individual properties.

Test Methods

Surface Gloss

Surface gloss is measured with a measurement angle of 20° to DIN 67530.

Luminous Transmittance/Transparency

For the purposes of the present invention, the luminous transmittance/transparency is the ratio of total light transmitted to the amount of incident light.

Luminous transmittance is measured using "Hazegard plus" test equipment to ASTM D 1003.

Surface Defects and Uniform Coloration

Surface defects and uniform coloration are determined visually.

Mechanical Properties

The modulus of elasticity, tear strength and elongation at break are measured longitudinally and transversely to ISO 527-1-2.

SV (DCA) and IV (DCA)

The standard viscosity SV (DCA) is measured by a method based on DIN 53726 in dichloroacetic acid.

The intrinsic viscosity (IV) is calculated as follows from the standard viscosity (SV)

$$IV(DCA) = 6.67 \cdot 10^{-4} SV(DCA) + 0.118$$

Yellowness Index

The Yellowness Index YID is the deviation from the colorless condition in the "yellow" direction and is measured to DIN 6167.

Whiteness

Whiteness is determined by the method of Berger, generally using more than 20 mutually superposed layers of film. Whiteness is determined with the aid of the ®ELREPHO electrical reflectance photometer from Zeiss, Oberkochem, Germany, with standard illuminant C and 2° standard observer. Whiteness is defined as W=RY+3RZ−3RX. W=whiteness, and RY, RZ and RX=corresponding reflection factors using the Y, Z and X color-measurement filter. The whiteness standard used is a barium sulfate pressing (DIN 5033, Part 9). Hansl'Loos, "Farbmessung" [Color measurement], Verlag Beruf und Schule, Itzehoe (1989) gives a detailed description.

In the examples and comparative examples below, each of the films is a single-layer opaque white film, produced on the extrusion line described.

EXAMPLE 1

An opaque white film of 50 μm thickness was produced and comprised polyethylene terephthalate (RT32, KoSa, Germany) as principal constituent, 18% by weight of barium sulfate (Blanc fixe XR-HX, Sachtleben Chemie), 200 ppm of optical brightener (Tinopal, Ciba-Geigy, Basle) and 40 ppm of blue dye (Sudan Blue 2, BASF, Ludwigshafen).

The additives barium sulfate, optical brightener and blue dye were added as masterbatches. The polyethylene terephthalate used for preparing the masterbatches, had a standard viscosity SV (DCA) of from 900 to 1100.

Masterbatch (1) was composed of clear polymer, 50% by weight of barium sulfate and 600 ppm of optical brightener. Masterbatch (2) comprised, in addition to clear polymer, 2000 ppm of blue dye.

Prior to extrusion, 36% by weight of masterbatch (1), 2% by weight of masterbatch (2) and 62% by weight of clear polymer were dried at a temperature of 150° C. and then melted in the extruder.

The longitudinal stretching ratio established during production of the film was precisely 3.1.

EXAMPLE 2

Example 1 was repeated, except that the film was not provided with blue dye.

EXAMPLE 3

The mixing specification corresponded to that of Example 2, but the longitudinal stretching ratio was increased to 3.3, while the longitudinal stretching temperatures remained unchanged.

EXAMPLE 4

A coextruded opaque white ABA film of 75 μm thickness was produced, A symbolizing the outer layers and B the core layer. The mixing specification of the 71 μm-thick core layer corresponded to the mixing specification of Example 2. The outer layers, of 2 μm thickness, comprised 93% by weight of clear polymer and also 7% by weight of a masterbatch comprising, in addition to clear polymer, 10,000 ppm of silicon dioxide (®Sylobloc, Grace, Germany). This film had particularly high surface gloss. The longitudinal stretching ratio was 3.3.

COMPARATIVE EXAMPLE 1

Example 3 was repeated, except that the longitudinal stretching ratio was reduced to 2.8 but the longitudinal stretching temperatures established remained unchanged.

COMPARATIVE EXAMPLE 2

Comparative Example 1 was repeated, except that the film was not provided with optical brightener. The film comprised only 18% by weight of barium sulfate which was incorporated directly during preparation of the polymer. The standard viscosity of the polymer comprising barium sulfate was 810.

The opaque white PET films produced in Examples 1 to 4 and the films of Comparative Examples 1 and 2 had the property profiles illustrated in the table below:

TABLE

| Properties | Ex. 1 | Ex. 2 | Ex. 3 | Ex. 4 | Comp. Ex. 1 | Comp. Ex. 2 |
|---|---|---|---|---|---|---|
| Thickness [μm] | 50 | 50 | 50 | 75 | 50 | 50 |
| Surface gloss side 1 | 20 | 20 | 20 | 165 | 20 | 20 |

TABLE-continued

| Properties | Ex. 1 | Ex. 2 | Ex. 3 | Ex. 4 | Comp. Ex. 1 | Comp. Ex. 2 |
|---|---|---|---|---|---|---|
| (Measurement angle 20°) side 2 | 20 | 20 | 20 | 165 | 20 | 20 |
| Luminous transmittance/transparency [%] | 20 | 20 | 16 | 12 | 25 | 24 |
| Yellowness Index (YID) | 12 | 14 | 14 | 18 | 15 | 24 |
| Whiteness by Berger method [%] | 93 | 91 | 91 | 90 | 91 | 84 |
| Longitudinal modulus of elasticity [N/mm²] | 3600 | 3600 | 3650 | 3650 | 3350 | 3500 |
| Transverse modulus of elasticity [N/mm²] | 5200 | 5300 | 5200 | 5300 | 5300 | 5300 |
| Longitudinal tear strength [N/mm²] | 150 | 155 | 155 | 150 | 150 | 150 |
| Transverse tear strength [N/mm²] | 240 | 240 | 235 | 240 | 250 | 250 |
| Longitudinal elongation at break [%] | 180 | 175 | 175 | 170 | 180 | 175 |
| Transverse elongation at break [%] | 70 | 75 | 75 | 75 | 70 | 80 |
| Coloration | brilliant white | brilliant white | brilliant white | brilliant white | brilliant white | tinged yellow |

What is claimed is:

1. An opaque white film with a thickness of from 10 to 500 µm, wherein the film comprises a single crystallizable thermoplastic, barium sulfate, and optical brightener, wherein said crystallizable thermoplastic consists essentially of polyester, wherein the surface gloss of the film measured by DIN 67570 (measurement angle 20°) is greater than or equal to 10, and the luminous transmittance (transparency) of the film measured by ASTM-D1003 is less than or equal to 30%, said film has a Yellowness Index of less than or equal to 20 for 50 micron-thick films, and the film has a longitudinal modulus of elasticity of greater than or equal to 3,300 N/mm², a transverse modulus of elasticity of greater than or equal to 4,200 N/mm², a longitudinal tear strength of greater than 120 N/mm², a transverse tear strength of greater than or equal to 170 N/mm², a longitudinal elongation at break of greater than or equal to 120%, and a transverse elongation at break of greater than or equal to 50%.

2. The opaque white film as claimed in claim 1, wherein the crystallizable thermoplastic has been selected from the group consisting of polyethylene terephthalate, polybutylene terephthalate and polyethylene naphthalate.

3. The opaque white film as claimed in claim 1, wherein from 0.2 to 40% by weight of barium sulfate, based on the weight of the crystallizable thermoplastic, is present in the film and the barium sulfate is fed to the thermoplastic by way of masterbatch technology during film production.

4. The opaque white film as claimed in claim 1, wherein from 10 to 50,000 ppm, of optical brightener, based on the weight of the crystallizable thermoplastic, is present in the film and the optical brightener is fed to the thermoplastic by way of masterbatch technology during film production.

5. The opaque white film as claimed in claim 4, wherein the optical brightener has been selected from the group consisting of bisbenzoxazoles, phenylcoumarins and bis-stearylbiphenyls.

6. The opaque white film as claimed in claim 1, wherein said film is biaxially oriented and further comprises a polyester-soluble blue dye selected from the group consisting of cobalt blue, ultramarine blue and anthraquinone dyes, and the amount of blue dye is from 10 to 10,000 ppm, based on the weight of the crystallizable thermoplastic.

7. The opaque white film as claimed in claim 1, wherein the barium sulphate is present as precipitated barium sulfate in the film and is in the form of fine-particle colorless powder with an average grain size of from 0.1 to 5 µm, measured by the Sedigraph method.

8. The opaque white film as claimed in claim 1, wherein the surface gloss of the film measured to DIN 67530 (measurement angle 20°) is greater than or equal to 10, and the luminous transmittance (transparency) of the film, measured to ASTM-D 1003 is less than or equal to 30%.

9. The opaque white film as claimed in claim 1, wherein the film has one or more layers, and the embodiment having more than one layer comprises at least one core layer and at least one outer layer.

10. The opaque white film as claimed in claim 9, wherein, in the embodiment having more than one layer, the barium sulfate and the optical brightener are present in the core layer.

11. The opaque white film as claimed in claim 10, wherein the outer layer(s), too, have been provided with barium sulfate and optical brightener.

12. The opaque white film as claimed in claim 1, wherein a scratch-resistant coating, a copolyester or an adhesion promoter has been provided on at least one side of the film.

13. The opaque white film as claimed in claim 1, wherein said opaque white film further comprises regrind.

14. An opaque white film with a thickness of from 10 to 500 µm, wherein the film comprises a single crystallizable thermoplastic consisting essentially of polyester, barium sulfate and optical brightener, said optical brightener reemitting UV radiation as visible blue-violet light, said film exhibiting a Yellowness Index of less than or equal to 20 for 50 micron-thick films and a Yellowness Index of less than or equal to 45 for 250 micron films.

15. A film according to claim 14, wherein an increase of 7% in the longitudinal stretching ratio yields a reduction of from 15 to 20% in transparency within said film.

16. An opaque white film, wherein the film comprises a single crystallizable thermoplastic consisting essentially of polyester, barium sulfate and optical brightener, said barium sulfate having a density between 4 and 5 g/cm³ and present in an amount of from 15 to 40%, said film exhibiting a transverse tear strength of greater than or equal to 170 N/mm².

17. A film according to claim 16, wherein said barium sulfate has a particle size ranging from 0.1 to 5 micron.

18. An opaque white multi-layered film, said film comprising at least one core layer and at least one outer layer,
said core layer comprising a single crystallizable thermoplastic consisting essentially of polyester, barium sulfate and optical brightener,
said outer layer comprising crystallizable thermoplastic and optional silicon dioxide alone, said barium sulfate and optical brightener absent from said outer layer,
said film exhibiting a transverse tear strength of greater than or equal to 170 N/mm$^2$.

19. An opaque white film with a thickness of from 10 to 500 μm, wherein the film comprises a single crystallizable thermoplastic, barium sulfate, and optical brightener, wherein said crystallizable thermoplastic consists essentially of polyester, said film exhibiting a transverse tear strength of greater than or equal to 170 N/mm$^2$.

* * * * *

UNITED STATES PATENT AND TRADEMARK OFFICE
CERTIFICATE OF CORRECTION

PATENT NO. : 6,939,600 B2
DATED : September 6, 2005
INVENTOR(S) : Ursula Murschall et al.

It is certified that error appears in the above-identified patent and that said Letters Patent is hereby corrected as shown below:

Title page,
Item [56], References Cited, U.S. PATENT DOCUMENTS, delete
"6,282,491 B1  8/2001  Bochmann *et al.*
 6,426,709 B1  7/2002  Becker *et al.*".
OTHER PUBLICATIONS, delete each of the following:
"*"USA: Nissan standardises telematics on 2003 Infiniti modes"*; Apr. 3, 2002; www.just-auto.com.";

"*"The Meaning of Telematics"*; Oct. 22, 2002; www.global-telematics.com/telematics.htm.";

"Kuriko Miyake; *"DoCoMo, Nissan to develop car telematics"*; Feb. 19, 2002; IDG New Service\Tokyo Bureau.";

"*"GDT And TrafficCast To Deliver Real-Time Traffic Information"*; Mar. 20, 2003; www.itsa.org.";

"*"Communications Industry Considers Measures To Ensure It Meets The Needs Of Public Safety During Crisis"*; Mar. 17, 2003; www.itsa.org.";

"*"Product Innovations Drive the Emerging Automotive Entertainment and Navigation Systems Marker"*; Mar. 19, 2003; www.itsa.org".

Signed and Sealed this

Fifteenth Day of November, 2005

JON W. DUDAS
*Director of the United States Patent and Trademark Office*